April 5, 1938.  G. M. COULTER  2,113,267
STEERING MECHANISM FOR VEHICLES
Filed Nov. 16, 1936
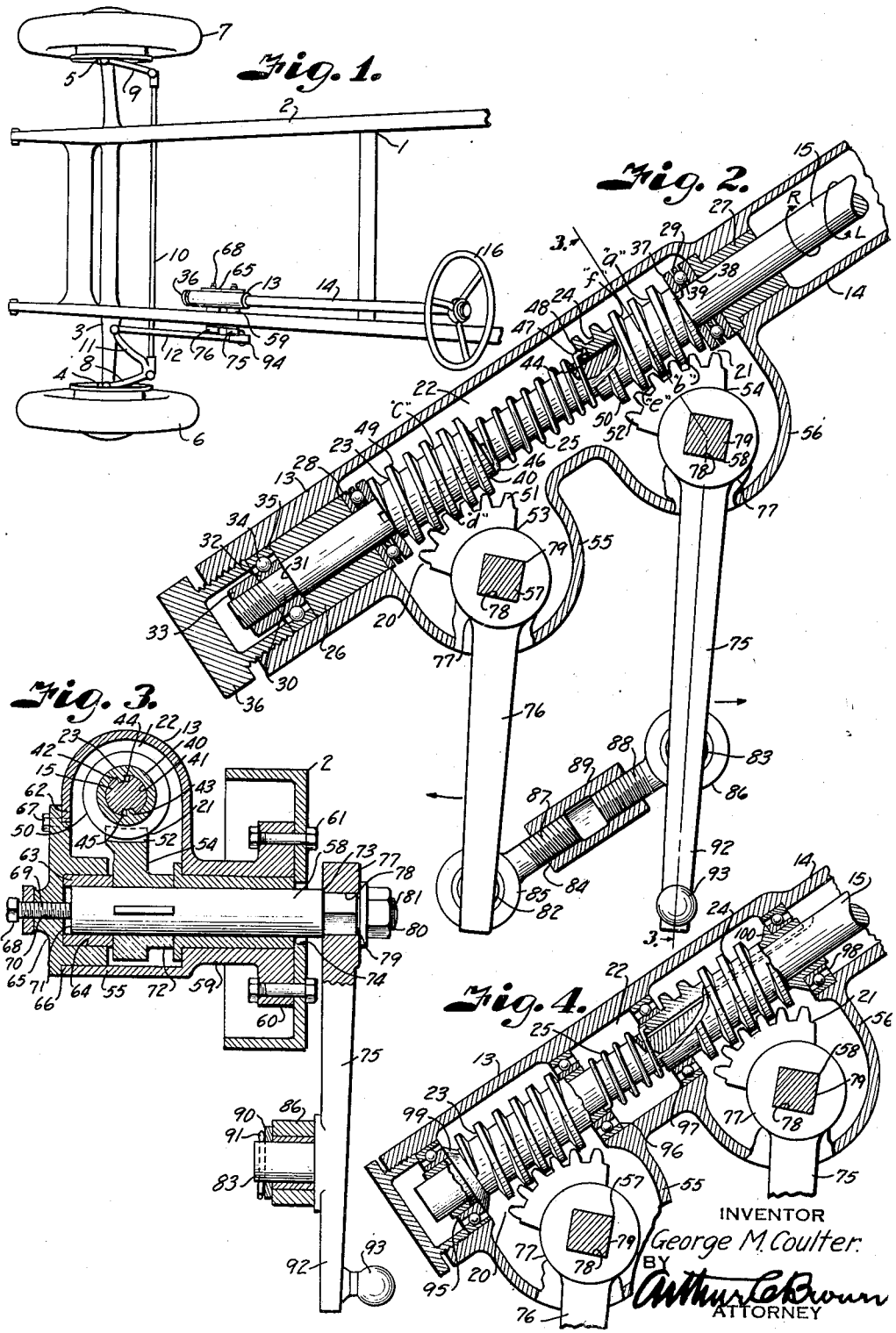
INVENTOR
George M. Coulter.
BY
Arthur C. Brown
ATTORNEY Patented Apr. 5, 1938

2,113,267

UNITED STATES PATENT OFFICE 2,113,267

STEERING MECHANISM FOR VEHICLES

George M. Coulter, Leon, Kans.

Application November 16, 1936, Serial No. 111,028

8 Claims. (Cl. 74—500)

This invention relates to steering mechanisms and particularly to those of the worm and sector type. In transmissions of this character sufficient play occurs between the teeth of the worm and sector to make steering of a vehicle difficult particularly when operating over uneven road surfaces. This looseness increases on wear of the parts with the result that driving of the vehicle becomes dangerous unless the parts are readjusted or replaced. Therefore the principal objects of the present invention are to provide a steering mechanism of this character which is easily operated, and which is constructed to automatically compensate for tooth clearance and normal wear of the parts, thereby eliminating the customary back-lash and providing a safe and reliable steering mechanism.

In accomplishing these and other objects of the invention, as hereinafter pointed out, I have provided improved details of construction, the preferred forms of which are illustrated in the accompanying drawing, wherein:

Fig. 1 is a plan view of the front portion of a vehicle chassis equipped with a steering mechanism embodying the features of the present invention.

Fig. 2 is a longitudinal section through the steering gear housing, particularly illustrating the double worm and sector arrangement for eliminating back-lash normally caused by tooth clearances and wear.

Fig. 3 is a cross-section on the line 3—3 of Fig. 2.

Fig. 4 is a section similar to Fig. 2 through a modified form of the invention.

Referring more in detail to the drawing:

1 designates a front portion of a conventional vehicle chassis including a frame 2 having connection with an axle 3, and mounted on the ends of the axle are steering spindles 4 and 5 carrying wheels 6 and 7. The steering spindles are provided with steering arms 8 and 9 that are connected by a tie rod 10 to retain the wheels in parallel alignment. Connected with the steering arm 8 is an arm 11 to which is attached the forward end of a drag link 12. Fixed to the frame 2 on the side adjacent the drag link is a steering gear housing 13 carrying a steering column 14 enclosing a steering shaft 15, which is operated by a steering wheel 16 rotatably mounted at the upper end of the column.

The parts thus far described are conventional to any present day motor driven vehicle and the steering shaft 15 is usually provided with a worm meshing with a sector having connection with the drag link through a steering gear arm, the drag link being connected with a steering arm by a conventional ball and socket joint.

In order that steering mechanisms of this character may be easily operated, certain clearances must be provided between the teeth of the worm and the worm sector. This provides a certain amount of back-lash when the direction of rotation of the steering wheel is reversed, and when the vehicle is driven over uneven surfaces, the irregularities cause the wheels to vibrate as it is impossible to hold them on a steady course because of the back-lash occurring between the worm and worm sector. Steering of the vehicle is, therefore, made difficult and hazardous, particularly when the teeth begin to wear. I have, therefore, provided an improved connection between the steering wheel shaft and the drag link wherein back-lash is compensated for through the introduction of a dual set of worms and worm sectors 20 and 21, one of which is immediately effective when the steering wheel is turned in one direction and the other when the steering wheel is turned in the opposite direction, as now to be described.

The gear housing 13 is slightly longer in length than conventional housings to form a worm compartment 22 of sufficient length to accommodate worm gears 23 and 24 and an intermediate coil spring 25. The steering shaft 15 has its lower end rotatably mounted in bearing bushings 26 and 27 located at the respective ends of the worm compartment and arranged to seat antifriction thrust bearings 28 and 29. The lower end of the shaft 15 is provided with a reduced extension 30 to form a shoulder 31 to engage against an inner race 32 that is sleeved on the extension and urged against the shoulder by a nut 33 threaded on the extension 30. Operable on the race 32 are ball bearings 34 also engaging an outer race 35 that is retained against the outer end of the bushing 26 by a nut 36 that is threaded into the lower end of the steering gear housing as clearly shown in Fig. 2. It is thus obvious that the antifriction bearing, while allowing free rotation of the shaft 15, prevents longitudinal movement thereof relatively to the gear housing, or in case of excessive wear the relative positions of the worms and sectors may be adjusted by tightening the nut 36.

The thrust bearings 28 and 29 may be of any approved construction but are here shown as including inner and outer plate-like races 37 and 38 mounting the antifriction members 39 therebetween. The outer plates for the bearings 28 and 29 respectively engage against the ends of the bushings while the inner plates form seats for the outer ends of the worms 23 and 24. The worms 23 and 24 may be of standard construction in that they include sleeve-like body portions 40, but the inner bores 41 thereof are of sufficient diameter to allow running fit of the shaft 15 therein so that the worms are loose on the shaft in the direction of the thrust bearings and have slight, rotative movement as controlled by diametrically spaced splines 42 and 43, projecting inwardly of the bores and engaging in ways 44 and 45 formed in opposite sides of the steering shaft.

The ways are of greater width than the splines to allow limited rotative movement of the worms under action of the spring 25 which is sleeved on the shaft intermediate the worms and has its ends 46 and 47 bent laterally and engaged in sockets 48 provided in the ends of the worms, as best shown in Fig. 2. The worms have helical teeth 49 and 50 respectively engaging with teeth 51 and 52 of worm sectors 53 and 54. The worm sectors are housed in lateral extensions 55 and 56 of the steering gear housing and are supported in meshing relation with the worms on steering arm shafts 57 and 58 respectively. The steering arm shafts 57 and 58 are rotatably mounted in bearing extensions 59 having flanges 60 whereby the gear housing is secured to the chassis frame by bolts 61 as best shown in Fig. 3.

The bearing extensions 59 are provided with flanges 62 to cooperate with similar bushings 63 that are mounted in sockets 64 formed in a plate 65 closing openings 66 in the housing through which the sectors are inserted. The plates 65 are secured to the housing by fastening devices, such as cap screws 67, and carry adjusting screws 68 having their shanks 69 threadedly mounted in openings 70 and bearing against the ends 71 of the steering arm shafts. The worm sectors have hubs 72 that are rigidly secured to the shafts 57 and 58 by suitable splines, or they may be forged as an integral part thereof. The opposite ends 73 of the shafts project through openings 74 in the chassis frame and are respectively connected with a steering gear arm 75 and a supplementary arm 76. The steering gear arms preferably have hub portions 77 provided with polygonal shaped openings 78 receiving polygonal shaped ends 79 of the shafts so that when the steering arm shafts are oscillated the steering arms are moved therewith to effect actuation of the drag link. In the illustrated instance, the arms are retained on the shafts by nuts 80 that are mounted on threaded extensions 81 of the shafts to engage against the ends of the hubs as shown in Fig. 3.

Formed on the arms 75 and 76, at a point spaced equally distant from the ways of the shafts 57 and 58, are lateral studs 82 and 83 respectively which are connected by a turnbuckle 84. The turnbuckle 84 is best illustrated in Fig. 2 and includes bushed eyes 85 and 86 for mounting on the respective pins, and threaded shanks 87 and 88 that are preferably right and left threaded and are interconnected by a threaded coupling sleeve 89. The eyes of the turnbuckle are retained on the studs by washers 90 secured by cotter pins 91 extending through suitable openings in the outer ends of the studs. In order to prevent interference with the drag link, the arm 75 extends below its pivotal connection with the turnbuckle as shown at 92 to carry a ball 93 to which a socketed end 94 of the drag link is connected.

The form of the invention illustrated in Fig. 4 is substantially identical to that illustrated in Fig. 2, except that the ends of the worms are rotatably mounted in antifriction bearings 95—96 and 97—98 which have their outer races seated within the gear housing, the lower end of the shaft being carried by the worms. The outer bearings 95 and 98 are combination radial and thrust bearings, and the inner races thereof are engaged by collars 99 and 100 on the respective worms under action of the spring 25. In other respects the construction is the same as that illustrated in Fig. 2 and like numerals are applied thereto.

In assembling a steering mechanism constructed as described, the coils of the spring 25 are wound sufficiently so that the rotary forces are applied to the worms in opposite directions. In other words, the splines 42 and 43 for the upper worm engage one side of the shaft grooves while the splines for the other worm 23 engage the opposite sides of the shaft grooves. The nut 36 is then turned to adjust the position of the worms relative to the sectors so the worm teeth may engage the sector teeth under influence of the spring in the arc allowed by the splines. The turnbuckle 82 is then adjusted so that the arms 75 and 76 are kept in parallel relation when actuated by their respective worms so that the wheels 6 and 7 will have the same turning radius in both right and left directions.

In a vehicle with a left-hand drive, as illustrated, the threads of the worms are left-hand so that the steering wheel will turn in the direction that the vehicle is to be steered. When the shaft 15 is at rest in neutral position with the wheels in straightaway direction, the spring 25 will exert torque on the worm 24 so as to retain the working faces "a" of one or more of the threads thereof against the working face "b" of the teeth of the worm sector so that there is no lost motion therebetween when the shaft is turned to the right, as shown by arrow "R" in Fig. 2. The spring exerts a similar force on the other worm to retain the working face "c" of one or more threads thereof in contact with the working faces "d" of the teeth of the worm sector 53 when the shaft is turned to the left, as shown by arrow "L" in Fig. 2. It is thus obvious that the effective working surfaces of the teeth of the gear sectors are in contact with the effective working surfaces of the worm threads and that the opposite faces "e" of the teeth are disengaged from the faces "f" of the worm to provide the necessary tooth clearances. Since the effective working surfaces are kept in contact through the medium of the spring 25 and because the arms 75 and 76 are connected in parallelism, the steering wheels 6 and 7 are in effect locked in parallel alignment for the reason that the back-lash in one gear set is opposed by contact of the working surfaces in the other gear set and vice versa. When the worms are in this position the splines for the worms 24 tend to engage the sides of the ways in the direction of right-hand rotation of the shaft and the splines for the worms 23 tend to engage the sides of the ways in the direction of left-hand rotation of the shaft. In other words, the worm 24 which is effective for right-hand turns is in advance of the shaft rotation in an amount substantially equivalent to the difference between the width of the splines and that of the grooves, and the splines on the worm 23 are in position so that the worm 23 is turned immediately upon initial movement of the shaft in a right-hand direction, the initial movement of the shaft having no effect on the worm 24, however, the worm 23 is turned toward the right with the shaft a sufficient amount to disengage the working surfaces of the threads with the working surfaces of the teeth, thereby providing the necessary clearance between the threads of the worm 23 and sector 53. The working surfaces of the threads for the worm 24, however, are kept in contact with the working surfaces of the teeth of the sector 54 since the shaft rotates within the worm the slight amount necessary to engage the opposite side of the ways with the splines whereupon the worm is rotated directly with the shaft to maintain contact of the working surfaces of the threads with those of the teeth on the sector 54 to cause movement of the arm 75 in an anticlockwise direction, as shown by the arrows, thereby turning the wheels 6 and 7 to the right.

Now, assuming that the vehicle is to be turned to the left instead of to the right, the shaft 15 will be rotated in the opposite direction as indicated by the arrow "L" in Fig. 2. This movement will cause immediate rotative movement of the worm 24 to effect clearance between the threads thereof and the teeth of the sector 54 while the working surfaces of the threads for the worm 23 are retained in contact with the working surfaces of the teeth for the sector 53, and as soon as play is taken up between the splines of the worm 23 and the ways of the shaft, the arm 76 is swung in a clockwise direction, as shown by the arrows, to actuate the arm 75 in the same direction through the turnbuckle connection 84, thereby effecting movement of the vehicle wheels 6 and 7 in the left-hand direction. Since the spring 25 retains the worms in seating engagement with the thrust bearings and the spring is wound to cause reverse torque on the respective worms, the working surfaces of the threads are kept in contact with the corresponding working surfaces of the sector teeth and any unevenness of the road tending to cause the wheels to vibrate is resisted, that is, movement of the wheels toward the left is resisted by one set of gears and movement toward the right is resisted by the other set of gears, however, when the wheel is rotated the locking action of one set of gears is released and the other set is rendered effective in turning the wheels to steer the vehicle in the desired direction.

The form of the invention illustrated in Fig. 4 operates in exactly the same manner as the one illustrated in Fig. 2, the only difference being in the mounting of the worms within the gear housing.

From the foregoing, it is obvious that I have provided a steering mechanism of the worm and sector type so constructed as to eliminate play that normally lends to unsteady and difficult steering of a vehicle.

What I claim and desire to secure by Letters Patent is:

1. In an apparatus of the character described, sets of driving and driven members, an actuating shaft, means securing the driving members in each set for limited rotary movement on said shaft, means interconnecting the driven members, and means interconnecting the driving members for yieldingly exerting torque on the respective driving members in opposite directions to render said driving members selectively effective dependent upon the direction of rotation of the actuating shaft.

2. In an apparatus of the character described, a shaft, spaced worms loosely keyed to the shaft, worm sectors meshing with the respective worms, steering arms connected with the worm sectors, a link connecting the steering arms, and means for exerting torque on the worms in opposite directions to eliminate back-lash between the worms and worm sectors.

3. In an apparatus of the character described, a shaft, spaced worms loosely keyed to the shaft, worm sectors meshing with the respective worms, steering arms connected with the worm sectors, a link connecting the steering arms, a coil spring wound on the shaft between said worms and having the ends thereof engagingly connected with said worms for exerting torque on the worms in opposite directions to eliminate backlash between the worms and worm sectors, and means for rotating the shaft to render said worms selectively effective in actuating the steering arms depending upon direction of rotation of the shaft.

4. In an apparatus of the character described, a shaft, spaced worms loosely keyed to the shaft, worm sectors meshing with the respective worms, steering arms connected with the worm sectors, a link connecting the steering arms, and means for effecting movement of the peripheries of the worms in opposite transverse directions relative to the respective worm sectors for maintaining driving contact of one of the sectors with its worm and relieving contact of the other worm with its sector when the shaft is rotated in a selected direction.

5. In an apparatus of the character described, a shaft, spaced worms loosely keyed to the shaft, worm sectors meshing with the respective worms, means interconnecting the worm sectors, means for rotating the worms in opposite directions on the shaft for maintaining contact of the sectors with the respective worms for locking the sectors against movement and means for relieving contact of one of the worms with its sector and effecting driving contact of the other worm with its sector when the shaft is rotated in one direction.

6. In an apparatus of the character described, a shaft, spaced worms loosely keyed to the shaft, worm sectors meshing with the respective worms, steering arms connected with the worm sectors, a link connecting the steering arms, a turn buckle in the link for adjusting parallelisms of said arms, means for exerting torque on the worms in opposite directions to eliminate back-lash between the worms and worm sectors, and means for selectively releasing driving contact of one of said worms with its sector when the shaft is rotated.

7. In an apparatus of the character described, sets of worms and worm sectors, an actuating shaft, means for securing the worms in each set for limited rotary movement on said shaft, means interconnecting the worm sectors, and means for interconnecting and rotating the worms in opposite directions relative to the shaft for locking the worm sectors against movement.

8. In an apparatus of the character described, sets of worms and worm sectors, an actuating shaft, means for securing the worms in each set for limited rotary movement on said shaft, means interconnecting the worm sectors, means for interconnecting and rotating the worms in opposite directions relative to the shaft for locking the worm sectors against movement, and means for rendering the worms selectively effective in actuating the worm sectors depending upon direction of rotation of the shaft.

GEORGE M. COULTER.